Nov. 15, 1938.   H. L. TRIMBLE   2,136,529
SURFACING MACHINE
Filed Jan. 12, 1934   5 Sheets-Sheet 1

INVENTOR
Homer L. Trimble.
BY
George V. Woodling
ATTORNEY

Nov. 15, 1938.  H. L. TRIMBLE  2,136,529
SURFACING MACHINE
Filed Jan. 12, 1934   5 Sheets-Sheet 2

INVENTOR
Homer L. Trimble.
BY George V. Woodling
ATTORNEY

Nov. 15, 1938.    H. L. TRIMBLE    2,136,529
SURFACING MACHINE
Filed Jan. 12, 1934    5 Sheets-Sheet 3

INVENTOR
Homer L. Trimble.
BY
George V. Woodling
ATTORNEY

Nov. 15, 1938.   H. L. TRIMBLE   2,136,529
SURFACING MACHINE
Filed Jan. 12, 1934   5 Sheets-Sheet 4

INVENTOR
Homer L. Trimble.
BY
George V. Woodling
ATTORNEY

Nov. 15, 1938.                H. L. TRIMBLE                2,136,529
                              SURFACING MACHINE
                            Filed Jan. 12, 1934          5 Sheets-Sheet 5

INVENTOR
HOMER L. TRIMBLE.
BY
George V. Woodling
ATTORNEY

Patented Nov. 15, 1938

2,136,529

UNITED STATES PATENT OFFICE 2,136,529

SURFACING MACHINE

Homer L. Trimble, Cleveland, Ohio, assignor to Harry C. Trimble, Boston, Mass.

Application January 12, 1934, Serial No. 706,370

38 Claims. (Cl. 51—170)

My invention relates to surfacing machines, and more particularly to power-driven surfacing machines adapted to surface floors or the like.

An object of my invention is the provision of a surfacing machine having a primary and a secondary frame pivotally connected together, whereby the working position of the surface drum relative to the surface to be worked may be varied by operating an adjustment which moves the secondary frame relative to the primary frame.

Another object of my invention is to provide for giving a sensitive and accurate adjustment to the working position of the surfacing drum relative to the surface to be worked.

A further object of my invention is the provision of suction means positioned rearwardly of the surfacing drum for collecting the dust or other particles from the surfacing drum, and from the surface that is being worked.

A still further object of my invention is the provision of resiliently mounting the motor that drives the surfacing drum in the frame of the surfacing machine, whereby the motor and the other parts carried thereby are substantially free from shocks or vibrations.

Another object of my invention relates to the provision of a universal connecting block connected to one end of the shaft of the motor, said connecting block being resiliently mounted in the frame of the surfacing machine, and also serving to constrain the shaft of the electric motor against rotation, the said connecting block being further provided with electrical contact members for engaging stationary terminal members in the frame of the surfacing machine, so that when the motor is once mounted into the frame of the surfacing machine the electrical connection between the contact members in the connecting block and the stationary terminal members in the frame provides for electrically connecting the electric motor in circuit relation with a suitable switch mounted on the frame of the surfacing machine, which switch controls the starting and stopping of the motor.

Another object of my invention is the provision of a centrifugal switch for controlling the starting windings and a suitable capacitor for the electric motor, whereby the starting windings and the capacitor may be cut out when the speed of the motor attains a predetermined value.

A still further object of my invention is the provision of an edging unit removably mounted in advance of the main surfacing machine, so that the operator may properly surface a floor, or other surface, that is adjacent to the side walls or that is in the corners where the main surfacing drum is unable to work.

Another object of my invention relates to an endless belt having a working surface which may be utilized in connection with the combination of the edging unit and the main surfacing drum of my surfacing machine.

A further object of my invention relates to a piece of surfacing material having a guiding element, or elements, which fit into complementary depressed guiding portions of the surfacing drum, whereby the piece of working material is securely and properly held in alignment under all working conditions.

Another object of my invention relates to the provision of a hollow handle having a light source mounted within the hollow handle in such manner that the hollow handle constitutes a reflector for the light source which illuminates the surface that is being worked.

A still further object of my invention relates to the provision of so constructing the sides of my surfacing machine that the lower side edges thereof are adapted to clear the quarter-round, or other strip of material, that is nailed or otherwise fastened at the junction of the floor and the wall so that the surfacing drum may work the surface of the floor adjacent to the quarter-round, or other strip of material.

Other objects, and a fuller understanding of my invention may be had by referring to the following description and claims, taken in conjunction with the accompanying drawings, in which like parts are designated by like reference characters, and in which:

Figures 2, 3:
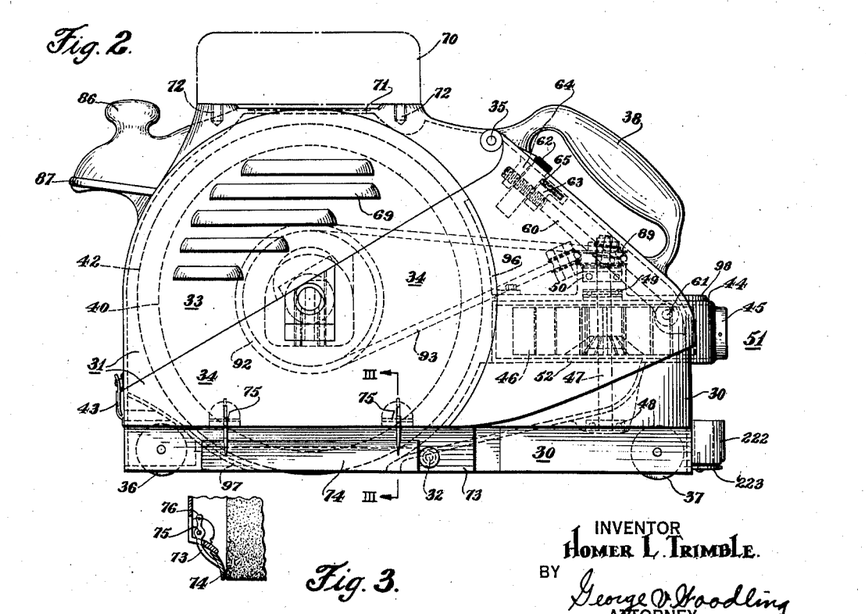
Figure 2 is an elevational side view of my surfacing machine shown in Figure 1.
Figure 3 is a fragmentary view partly in cross-section, taken along the line III—III of Figure 2.

With particular reference to Figure 2 of the drawings, the frame of my surfacing machine comprises two main parts, designated generally by the reference characters 30 and 31. For the purpose of clarity, the part designated by the reference character 30 will, hereinafter, be referred to as the primary frame, and the part designated by the reference character 31 will, hereinafter, be called the secondary frame.

The primary frame 30 includes, principally, a suction unit designated generally by the reference character 51, and the rearward lower portion of my surfacing machine which is carried by the rear set of casters 37. The secondary frame comprises two parts, one a lower portion designated generally by the reference character 34, and carried by the front set of casters 36, upon which portion the surfacing drum 42 is carried, and the other portion of the secondary frame includes a cover designated generally by the reference character 33, and hinged to the lower secondary portion 34 by means of a pivot pin 35.

The co-operative arrangement of the primary frame 30, and the secondary frame 31, for varying the working position of the surfacing drum 42, relative to the surface to be worked, will be described first.

With reference to Figure 2, the primary frame 30, and the secondary frame 31, are hinged together along their bottom portion by means of a transverse pivot rod 32. As illustrated, this pivotal connection between the primary frame 30 and the secondary frame 31, is substantially intermediate of the ends of the surfacing machine. Therefore, by means of this pivotal connection the secondary frame 31 may be moved up and down in somewhat of a scissors fashion with respect to the primary frame 30.

Figure 1:
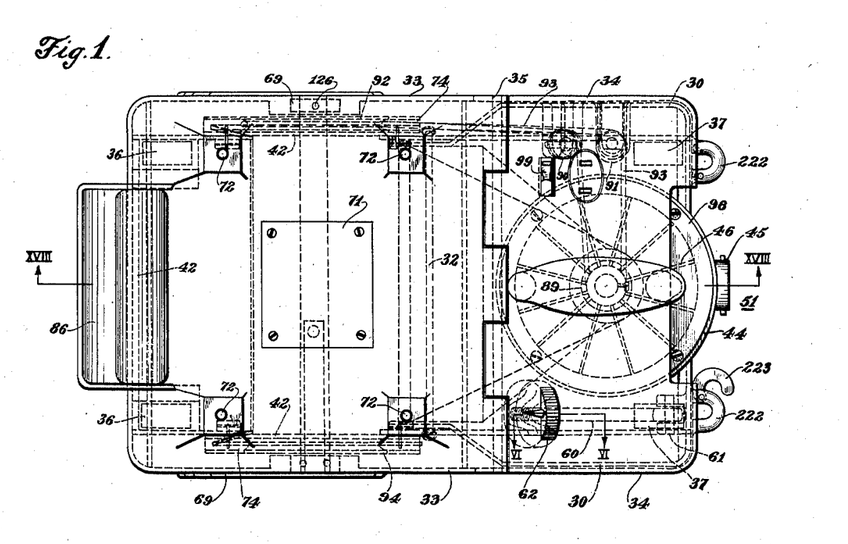
Figure 1 is a plan view of a surfacing machine embodying the features of my invention.

As shown best in Figure 1, that portion of the primary frame which is hinged to the pivotal rod 32, is somewhat narrower than the over-all width of the surfacing machine, being substantially the width of the surfacing drum 42; but that at a point slightly in rear of the pivotal rod 32 the primary frame extends outwardly until it engages the inner surface of the secondary frame, at which point the outer surface of the primary frame lies closely adjacent to the inner surface of the secondary frame.

Figures 5, 6, 7, 8, 9, 10:
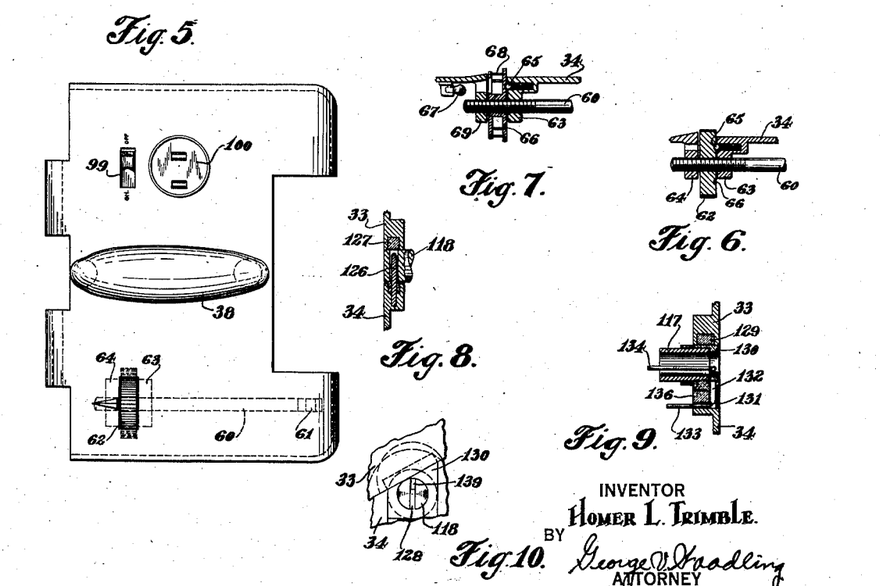
Figure 5 is a view of the rearward sloping cover only of my surfacing machine looking perpendicularly to the flat surface of the cover.
Figure 6 is a cross-sectional view taken along the line VI—VI of Figure 1, through a portion of the rotary adjustment means for regulating the working position of the surfacing drum relative to the surface that is to be worked.
Figure 7 is a fragmentary cross-sectional view of a modified arrangement of the rotary adjustment means shown in Figure 6.
Figure 8 is a fragmentary cross-sectional view showing the manner in which one end of the motor shaft is mounted in the secondary frame of my surfacing machine.
Figure 9 is a fragmentary cross-sectional view showing the manner in which the other end of the shaft of the motor is mounted in the secondary frame of my surfacing machine.
Figure 10 is a fragmentary, side-elevational view of the end of the motor shaft shown in Figure 8, and illustrates a modified arrangement from that shown in Figure 8 for mounting the end of the motor shaft in the secondary frame of my surfacing machine.
Figure 11:
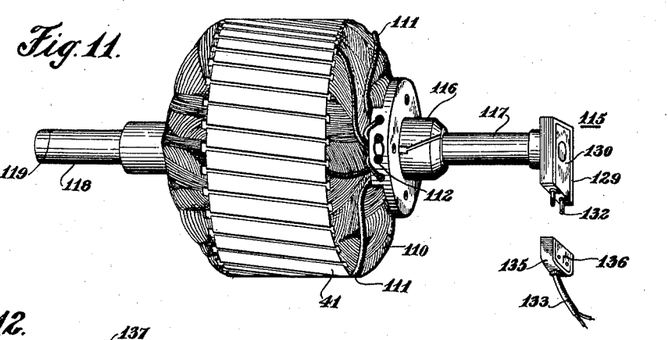
Figure 11 shows a perspective view of the stationary armature of the electric motor that is utilized to drive the surfacing drum.
Figure 12:
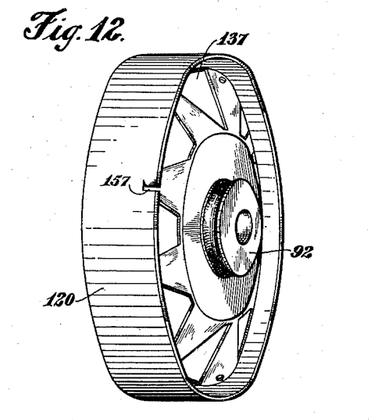
Figure 12 is a perspective view of the external surface of one of the end bells of the electric motor and constitutes a portion of the revolvable surfacing drum.
Figure 13:
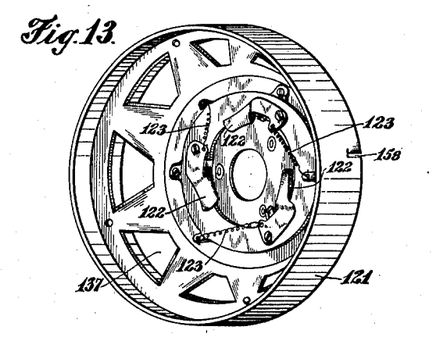
Figure 13 is a perspective view of the internal surface of the other end bell for the electric motor and constitutes a portion of the revolvable surfacing drum.

As illustrated in Figure 2, it is observed that the center line of the surfacing drum is somewhat in advance of the pivotal rod 32. Therefore, movement of the secondary frame 31 relative to the primary frame 30, causes the lower working tangential surface of the surfacing drum 42 to move up and down relative to the surface to be worked. As a means for moving the secondary frame 31 relative to the primary frame 30 to vary the working engagement between the surface drum 42 and the surface to be worked, I employ a rotary adjustment means 62 carried by the secondary frame 31, together with an interconnecting rod 60 having its lower end thereof pivotally connected by means of a pin 61 to the primary frame 30. The rotary adjustment means 62 is provided with an internal thread for engaging the upper threaded end of the interconnecting rod 60, whereby the turning of the rotary adjusting means 62 causes the secondary frame 31 to move relatively to the primary frame 30. The rotary adjustment means 62 may be carried by the secondary frame in any suitable manner, and as best shown in Figure 6 it is constrained between two stationarily mounted lugs 63 and 64. For the purpose of holding the rotary adjustment means 62 in any one of a plurality of positions, I provide a ball and socket ratchet means which includes a ball 65 that is resiliently biased by means of a coil spring into spaced depressions 66 on the face of the rotary adjustment means 62. In this manner, the constrained ball 65 prevents the rotary adjustment means 62 from turning when it is once set by the operator. For the convenience of the operator the peripheral edge of the rotary adjustment means 62 may be knurled or otherwise ridged so that the operator may turn the rotary adjustment means by his thumb while at the same time grasping the hand grip 38. The outer peripheral surface of the rotary adjustment means 62 may likewise be marked, or otherwise indicated for indicating to the operator the working position of the surfacing drum 42 relative to the surface to be worked. The outer peripheral surface of the rotary adjustment means 62 may likewise be marked to indicate the various grades or thicknesses of sand paper, or other working material. For instance, if the operator desires to use No. 3 sand paper, which is relatively coarse and heavy, he may correctly set the rotary adjustment means 62 at the point indicated for No. 3 sand paper. In this manner the operator is assured that the surfacing drum 42 is substantially correctly placed with reference to the surface to be worked without an unnecessary amount of trial and error attempts to find out exactly where the surfacing drum should be adjusted.

Heretofore, in the operation of a surfacing machine the operator would, in some cases, by trial and error, make the cut too deep in the surface to be worked and thus unnecessarily mar the surface. To correct a deep cut, such as referred to, it is necessary to cut away the surface over the entire floor in order that the surface may be uniform throughout. However, by means of my rotary adjustment means, which is marked to indicate the depth of the cut or the grade of the sand paper, or other working material, the possibility of making a deep cut is avoided.

Furthermore, the pivotal arrangement of the primary frame 32 and the secondary frame 31, together with the mounting of the surfacing drum 42 in advance of the pivotal rod 32, gives a delicate adjustment to the up and down movements of the surfacing drum relative to the surface to be worked. For instance, a relatively large movement of the rear end of the secondary frame relative to the primary frame causes only a relatively small up and down movement of the surfacing drum 42 relative to the surface to be worked. Thus, by reason of the fact that the rear end of the primary frame 30 is carried by the sets of casters 37, and that the front end of the secondary frame 31 is carried by the set of casters 36, it is observed that a downward or an upward movement of the rear end of the secondary frame 31 relative to the primary frame 30 causes the pivotal rod 32 to be lowered or raised by an amount that is substantially one-half as much as the downward or upward movement of the rear end of the secondary frame 31. However, the downward or upward movement of the surfacing drum 42, since its center line position is substantially midway between the pivotal rod 32 and the front set of casters 36, is substantially one-half of the downward or upward movement of the pivotal rod 32. This means that the resultant up and down movement transmitted to the surfacing drum 42 is substantially one-fourth as much as the up and down movement of the rear end of the secondary frame 31 relative to the primary frame. Therefore, it is noted that the up and down adjustment for the surfacing drum 42 is very delicate, which means that the operator may so adjust accurately the machine to take very fine cuts. It is to be understood, however, that the invention is not limited to the particular proportional relationships that exist between the pivotal connection of the primary frame and the secondary frame, together with the position of the surfacing drum as hereinabove referred to, but that by varying the positional relationship of the said co-operatively associated parts, the up and down movement of the surfacing drum may be made even more delicate than the particular showing in the drawings.

In Figure 7 I show a modified arrangement of the rotary adjustment means 62, in that the rotary adjustment means is provided with a transparent material 68 having indications thereon and illuminated by a small electric lamp 67. The indications provided upon the transparent material 68 may be similar to those provided upon the rotary adjustment means 62 shown in Figure 6. In this manner the operator may conveniently adjust the cutting depth of the surfacing drum in the dark.

The construction and assembly of the surfacing drum 42, together with the construction of the motor, may be described as follows:

With reference to Figures 11 to 14, inclusive, the reference character 41 represents a stationarily mounted field which is positioned within a revolvable rotor 40. In view of the fact that alternating current is substantially universally used, I preferably utilize an alternating current, single phase induction motor, which may be connected in circuit relation with the ordinary light socket of a home or apartment house. In order to obtain the torque required to start the single phase, induction motor a component of flux in quadutare in time and in space with the stator flux, must be produced at a standstill. However, after the motor is once started the rotor produces the required quadutare flux and thus the necessary torque to carry the load. To provide the necessary quadutare flux at standstill I utilize a split phase induction motor, in which the running windings are designated by the reference character 110, and in which the starting windings are designated by the reference character 111. As a provision for making the electric motor adaptable to both 110 voltage lighting circuit, and to 220 voltage lighting circuit, I provide for terminating both the running windings 110 and the starting windings 111 to the four terminals designated by the reference character 112. With the two intermediate terminals connected by a suitable link the armature is connected for 220 volts, and by interconnecting the upper No. 1 terminal to the next to the bottom terminal No. 3, and by interconnecting the next to the top terminal No. 2 to the lower terminal No. 4, the respective windings are connected in parallel and thus adaptable to 110 volt lighting system. Therefore, the operator may so change the connections of the armature to operate the electric motor either on 110 voltage system, or on a 220 voltage system, depending upon the source of supply available upon the premises.

Figure 14:
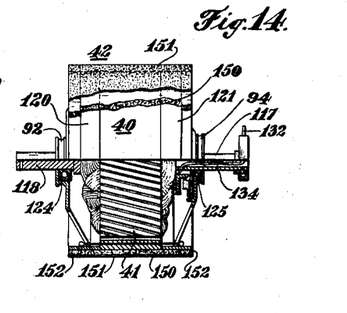
Figure 14 is a view of the electric motor and the surfacing drum, portions being cut away to show the arrangement of the co-operatively associated working elements.

As shown in Figure 14, the shafts 117 and 118 of the field 41 are mounted by means of antifriction ball bearings 124 and 125 within the end bells 120 and 121. The end bells are, in turn, securely connected to the revolvable rotor 40 by means of through bolts or other suitable connecting means which clamp the two end bells 120 and 121 adjacent to the revolvable rotor 40, thus making the assembly constitute a revolvable drum. As is usual practice, the revolvable drum is provided with a resilient covering 150, such as felt, rubber, paper, cloth, leather, cork or the like. This resilient covering may be connected to the revolvable rotor 40 in any suitable manner.

In accordance with the usual practice, the starting windings 111 are cut out when the speed of the motor attains a pre-determined value, which is usually approximately half speed. To accomplish this purpose, there is provided a centrifugal switch, which comprises two main parts; one part includes the arcuate segments 116 mounted upon the right hand side of the field 41, and the other part includes, principally, the contacting brushes 122 mounted internally of the end bell 121. The brushes 122 are constrained by means of a spring 123 to slidably engage the arcuate segments 116 when the speed of the motor is either at standstill or below the said pre-determined value. When the brushes are engaging the arcuate segments 116, the starting windings 111, as well as the running windings 110, are connected in circuit relation with the source of supply. However, when the speed of the motor reaches the said predetermined value the centrifugal force of the brushes is sufficient to overcome the biasing action of the spring 123, and the brushes disengage themselves from the arcuate segments 116 and thus disconnect the starting windings 111 from the source of supply.

To relieve the electric motor from as much shock as possible I provide for mounting both ends of the shaft of the motor upon cushions, such for example as soft rubber, or the like. With reference to Figure 8, which shows a mounting of the left hand end of the shaft 118, the reference character 127 represents a block of soft rubber, or other suitable means, on which the end of the shaft 118 is mounted. Therefore, the shock of the electric motor is absorbed by the rubber block 127, and by this means the life of the entire machine is materially prolonged. As a means to constrain the stationary field 41 of the motor against rotation, there is provided in the left hand end of the shaft 118 an opening 119, which extends diametrically through the shaft. As illustrated in Figure 8 there is provided in the lower portion 34 of the secondary frame 31 a complementary pin 126 which extends into the opening 119 for constraining the stationary field 41 of the motor against rotation. As is apparent, any other suitable means may be employed for constraining the stationary field 41 against rotation. One of such other means is represented by the fragmentary view in Figure 10. In this modified arrangement instead of the diametrically positioned opening 119 there is provided a diametrically positioned slot 139, cut into the left hand end of the shaft 118. Slidably positioned within this slot 139 is a key 128, which may be formed integrally with the lower portion 34 of the secondary frame 31. Thus, with the provision of the pin 126 as shown in Figure 8, and the key 128, as shown in Figure 10, the left hand end of the shaft 118 may be lifted from the lower portion 34 of the secondary frame 31 when the operator desires to remove the electric motor from the surfacing machine.

The right hand end of the shaft 117 of the electric motor is mounted in a universal connecting block 115 which slidably and resiliently fits in the lower portion 34 of the secondary frame 31. This universal connecting block 115 comprises a central portion 130 which may be constructed of some suitable insulating material such as hard rubber. Secured in the hard rubber 130 are two male contacts 132, which are electrically connected to the field windings of the electric motor by means of conductors 134. These contacts 132 are adapted to project into complementary female contacts 131, see Figure 9, provided in the stationary block 136 that is mounted in the lower portion 34 of the secondary frame 31. The stationary block 136, as well as the universal connecting block 115, is suitably lined around the outside with a resilient portion 135 and 129 respectively. By this construction, the left hand end of the motor shaft 117 is resiliently mounted within the lower portion 34 of the secondary frame 31. The central portion of the universal connecting block 115 is securely connected to the left hand end of the shaft 117 so that when the universal connecting block is slidably mounted into the lower portion 34 of the secondary frame 31 the shaft 117 is constrained against rotation. That is to say, the stationary field 41 of the motor is held against rotation both by the interlocking arrangement provided on the left hand end of the shaft 118, as well as by the universal connecting block 115 provided on the right hand end of the shaft 117. Therefore, it is noted that the universal connecting block 115 performs three separate and distinct functions: First, it provides a detachable electric connection for the field windings; second, it constrains the field of the electric motor against rotation; and third, it constitutes a resilient mounting for the left hand end of the shaft 117. The female contacts 131 are electrically connected to a snapswitch 99 mounted on top of the surfacing machine by means of the conductors 133. The snapswitch 99 is, in turn, connected to the electric plug receptacle 100.

As illustrated, the electric motor is held in the lower portion 34 of the secondary frame 31 by the closing of the hinged cover 33. When the hinged cover 33 is closed by the locking of the front latch 43 the lower edge of each side of the hinged cover 33 is disposed to hold both ends of the shaft of the electric motor within the lower portion 34 of the secondary frame 31. Accordingly, when the operator desires to remove the electric motor it is only necessary to unlatch the hinged cover 33, and tilt it backwards, then the operator may grasp the electric motor and slidably remove it from the lower portion 34 of the secondary frame 31. Thus, the construction of my surfacing machine facilitates the readily removing of the motor without disconnecting any bolts, screws, or the like.

In starting an electric motor the initial surge of the current, as well as the current drawn during the initial stages of the starting period, is quite large and for this reason some difficulty may be experienced in connecting a surfacing machine in circuit relation with the ordinary lighting circuit, for the reason that the current demand of the electric motor is so large that the lights are greatly dimmed. To make provisions for avoiding the consumption of a relatively large amount of current I provide means upon my surfacing machine for the employment of a suitable capacitor 70, see Figure 2, which may be mounted on the top of my surfacing machine by means of suitable cap screws 72, or by other suitable means. The provision of a capacitor 70, however, is optional depending upon the size of the surfacing machine, and for this reason the capacitor 70 on the drawings is indicated by a dash and dot line. The purpose of the capacitor 70 is to improve the power factor of the electric motor and thus materially increase the power developed by the electric motor, while at the same time materially decrease the amount of current drawn by the electric motor when driving the surfacing drum. The arrangement of the capacitor is such that it is connected in circuit relation with the centrifugal switch so that during the initial stages of the starting period the capacitor is connected in circuit relation with the field of the electric motor for decreasing the current drawn by the motor. However, when the speed of the electric motor reaches a predetermined value, which in usual practice is substantially half speed, the operation of the centrifugal switch disconnects the capacitor from the field of the motor. I find that by this arrangement my surfacing machine may be operated from an ordinary lighting circuit without materially dimming the lights of the house or the apartment. In some cases, however, for relatively large surfacing machines, I find that it is preferable to employ a capacitor having two portions, both of which portions being included in the field circuit during the initial stages of the starting period, and being arranged so that when the centrifugal switch is operated that one of the two portions of the capacitor is excluded from the field circuit, thus leaving the other portion of the capacitor in the field circuit during the running and operating period of the surfacing machine.

To prevent the electric motor from overheating there are provided in the sides of the end bells 120 and 121, a plurality of openings 137, and in the side of the hinged cover 33 there are provided a plurality of louvers 69. By this arrangement the motor may be properly ventilated by the air currents which flow through the openings 137 and the louvers 69.

As hereinbefore mentioned, the suction unit 51 is mounted in the rear of the surfacing drum 42. The suction unit, see Figure 18, comprises in general a fan 46, an intake housing designated generally by the reference character 95, a vertically mounted shaft 47, a pulley 89 by which the fan is driven, and a suction bag (not shown) adapted to be connected to the exhaust 45 of the suction unit 51. As shown best in Figure 18, the vertical shaft 47 is carried by three anti-friction ball bearings 48, 49 and 50. The bearings 48 and 50 provide for taking care of the radial thrust of the fan while rotating, and the bearing 49 takes care of the vertical thrust of the shaft 47.

Figure 18:
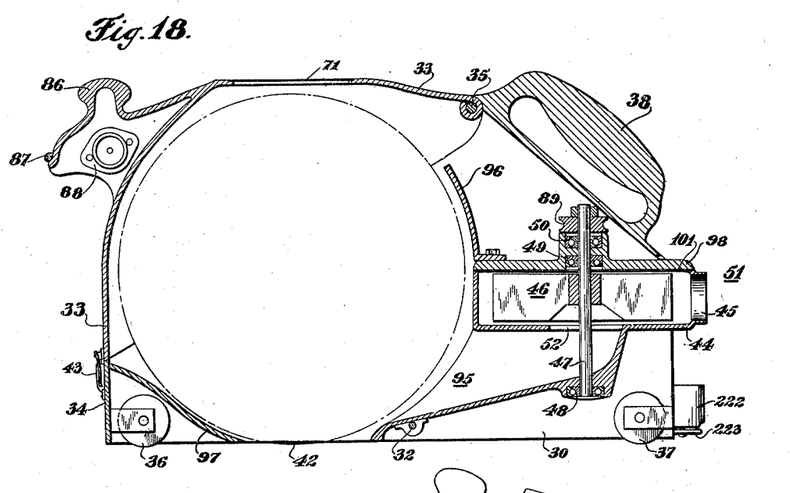
Figure 18 is a cross-sectional view of my surfacing machine taken along the line XVIII—XVIII of Figure 1.

The mouth of the intake 95 extends transversely of the surfacing drum 42, and is positioned closely to the surfacing drum so that the suction caused by the fan 46 collects the dust or other particles from the surfacing drum 42, as well as from the surface being worked. The particles collected are then drawn through an opening 52 provided in the bottom of the fan housing 44, at which point the fan 46 impels the dust through the exhaust 45 into a suitable dust collecting bag (not shown).

Figure 4:
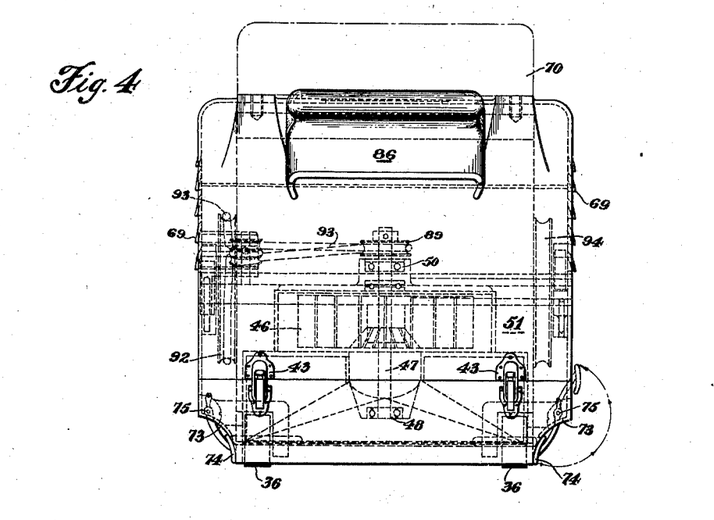
Figure 4 is an elevational view of the front of my surfacing machine.

As shown in Figure 18 there is a rubber gasket, or other suitable material, 101 clamped under the top lid 98 of the fan housing. By means of this rubber gasket 101 the noise usually created by a revolving fan is greatly eliminated. The fan 46 may be driven by the electric motor through any suitable means. As preferably illustrated, see Figures 1, 2 and 4, the fan is driven by means of a belt 93 looped around a pulley 92 provided on the end bell 120 of the surfacing drum. Since it is necessary to change the direction of travel of the belt 93 there are provided two idle pulleys, 90 and 91, over which the belt passes at the point of its change of direction of travel. Also any slack that may from time to time occur in the belt 93 may be taken up by the adjustment of these idle pulleys, 90 and 91.

Figures 21, 22, 23:
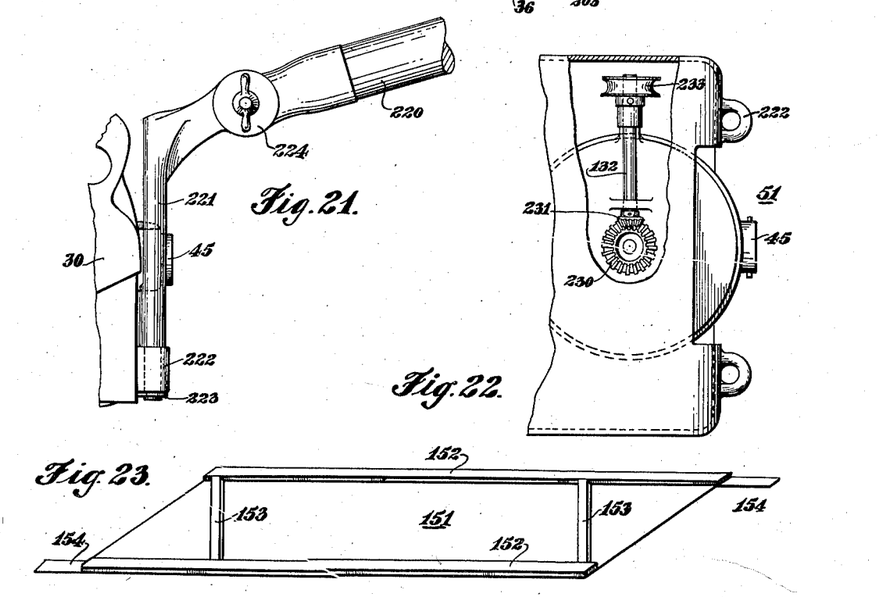
Figure 21 is a fragmentary view of the steering handle of my surfacing machine, and shows the manner in which it may be detachably removed when the surfacing machine is not in use.
Figure 22 is a fragmentary view of the rearward portion of my surfacing machine, and shows particularly, an arrangement of beveled gears for driving the suction unit that is mounted in rear of the surfacing drum.
Figure 23 is a perspective view of a strip of sand paper, or other working material, having guiding elements provided on the under surface for properly and securely holding the piece of sand paper, or other working material, in proper alignment on the surfacing drum.

In Figure 22 I illustrate a modified arrangement of the manner in which the fan 46 may be driven, in that the idle pulleys 90 and 91 are eliminated, and in which case the belt may directly drive a pulley 233 which is, in turn, connected to a set of beveled gears 230 and 231 by means of a shaft 232 for driving the fan 46.

In order to prevent the dust and other particles which may escape the intake 95 of the suction means 51 from collecting in the rearward part of my surfacing machine, there is provided an arcuate shield 96, which partly encompasses a rearward portion of the surfacing drum 42. This shield 96 may be suitably connected to the housing of the suction unit by means of a bolt or other suitable means. Also there is a shield 97, which partly encompasses the lower forward portion of the surfacing drum 42. Hence, very little dust or other particles are allowed to settle in the rear or forward portions of my surfacing machine.

Figure 15:
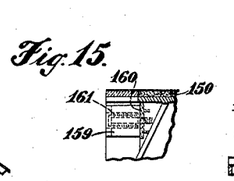
Figure 15 is a fragmentary view, partly in cross-section, of a rotary ratchet pulley for holding and tightening one end of a piece of sand paper, or other strip of working material, upon the surfacing drum.
Figure 16:
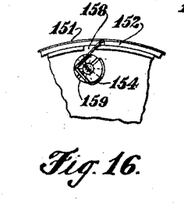
Figure 16 is a fragmentary view showing, principally, the front view of the rotary ratchet pulley shown in Figure 15.
Figure 17:
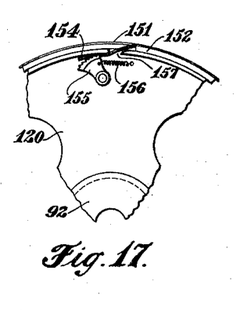
Figure 17 is a fragmentary view showing, principally, a segmental ratchet for holding the other end of a piece of sand paper, or other working material, upon the surfacing drum.

With reference to Figure 14, it is observed that the sand paper 151, or other working material, is fastened to the outer peripheral surface of the surfacing drum 42. An enlarged view of the piece of sand paper, or other working material, is shown in Figure 23. It is noted that the under surface of the sand paper, or other working material, is provided with two longitudinal guiding elements 152, and two transversely positioned guiding elements 153. These guiding elements are adapted to fit into complementary depressed portions provided on the outer peripheral surface of a surfacing drum 42. Accordingly, the piece of sand paper, or other surfacing material, is securely and properly held in alignment upon the surfacing drum. In Figure 23 it is observed that the opposite sides of each end of the piece of sand paper 51 are provided with extension tabs 154 which when the sand paper, or other suitable material, is mounted on the surfacing drum, are engaged and held by the segmental ratchet 155, as shown in Figure 17, and the rotary ratchet pulley 159, as shown in Figures 15 and 16. When mounting the strip of sand paper, or other working material, upon the surfacing drum, one of the extended tabs 154 is threaded through a slot 157 provided on the outer edge of the end bell 120, and thence engaged by the segmental ratchet 155, see Figure 17. When the extension tab 154 is once engaged by the segmental ratchet 155 the spring 156 constrains the segmental ratchet to engage continually the extension tab 154. After the one end of the piece of sand paper, or other suitable working material, is engaged by the segmental ratchet 155, the piece of sand paper, or other working material, is wrapped around the surfacing drum and the other extension tab 154 is passed through a suitable opening 158 provided on the peripheral edge of the end bell 121, and thence threaded through a slot of the rotary ratchet pulley 159, after which the operator may turn the rotary ratchet pulley 159 in a counter clockwise direction to draw up on and tighten the piece of sand paper, or other suitable material, around the surfacing drum. With reference to Figure 15, the rearward face of the rotary ratchet pulley 159 is provided with radial notches 160, which engage complementary radial notches provided upon the lateral face of the end bell 121. As shown in Figure 15, there is a spring 161 provided within the rotary ratchet pulley 159 for normally constraining the ratchet pulley 159 against the lateral surface of the end bell 121 for holding the rotary ratchet pulley 159 in a locked position. Therefore, it is only necessary for the operator to turn the rotary ratchet pulley 159 by means of a screw driver when tightening the piece of sand paper, or other suitable material, upon the surfacing drum. When removing a strip of sand paper, or other suitable material, it is only necessary for the operator to bias the segmental ratchet 155 in a counter clockwise direction for releasing the extended tab 154 after which the piece of sand paper, or other suitable material, may be unwrapped from the surfacing drum.

Figure 24:
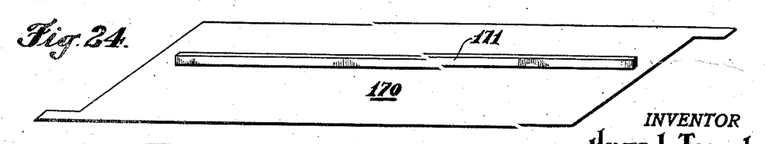
Figure 24 is a perspective view of a modified arrangement of the piece of sand paper, or other working material, wherein a single guiding element is provided substantially centrally of the piece of sand paper, or other working material.

In Figure 24 I show a modified arrangement of a piece of sand paper 170, or other suitable working material, in that only one longitudinal guiding element 171 is provided therefor. When a piece of sand paper, or other suitable material, such as shown in Figure 24 is utilized, the surfacing drum 42 is provided with a peripheral groove therein for the reception of the longitudinal guiding element 171.

In order to make it possible for the surfacing drum to work the surface adjacent to the quarter-rounds, or other strips that are fastened to the intersection of the floor and the wall, I provide for so constructing the lower side edges of my surfacing machine that the side frames clear the quarter-rounds, or other strips, while at the same time allowing the surfacing drum to work the surface that lies adjacent to the quarter-round, or other strip, which surface otherwise could not be worked. To carry out the construction of my surfacing machine, the lower side edges of my surfacing machine are constructed in an arcuate manner, see Figure 3. To clear the quarter-rounds, or other strips of material, together with the provision of a hinged, arcuate plate 74, which may be raised to expose the surfacing drum for such operations, see Figure 4. Therefore, when the arcuate plate 74 is swung up to its upper position the surfacing drum may be steered along the edge of the quarter-round, or other strip of material. The swinging arm 73 that holds the arcuate plate is pivoted to the side frame by means of a pin 75, see Figure 3. Also, there is provided a notch which is engaged by the upper end of the swinging arm 73 to secure the arcuate plate 74 in its upper-most position. In the operation of my surfacing machine, the arcuate side plate 74 is only raised when working the surface near the quarter-round, or other strip, near the side walls of the room, and thus when the machine is in use for other places on the floor the arcuate side plate 74 is moved to its lower position as shown in Figure 3. It is obvious that the arcuate side plate 74 may be dispensed with as far as the operation of my surfacing machine is concerned, but the primary purpose of the arcuate plate is to keep the surfacing drum 42 from being exposed so that a person who is unaccustomed to the operation of my surfacing machine cannot stick his fingers through the opening and contact the revolving surfacing drum which is liable to cause an injury.

There are certain applications whereby my surfacing machine may be used for polishing floors or the like. Therefore, in order to make it convenient for the operator to apply polishing material to the surfacing drum there is provided on the top of the surfacing machine a removable plate 71, see Figures 1 and 2. Thus, the operator may allow the polishing material to be fed through the opening when the cover plate 71 is removed.

I find it very desirable in a great many cases that the surface which is being worked should be illuminated to make it possible for the operator to see the surfacing action of my machine. To this end, I construct the front hand grip 86 in such manner that the under surface constitutes a reflector for a lamp screwed into the lamp socket 88, which is mounted within the hollow receptacle under the hand grip 86, see Figure 18. The light emanating from the lamp that is screwed into the socket 88 is such that it is cast directly upon the floor in advance of the surfacing machine. Around the forward edge and sides of the hand grip 86 there is provided a rubber strip 87 which absorbs the shock of the machine in case that it is pushed into an obstruction, such as the walls of the room.

In the operation of a surfacing machine, by reason of the fact that the surfacing drum is relatively large, it is impossible to work the surface in a corner of a room. Therefore, in Figure 19 I illustrate an edging unit 173 that is mounted in advance of the main surfacing machine. This edging unit comprises a secondary surfacing drum 174 pivotally mounted upon the forward ends of two side extension members 176, which, in turn, are pivotally connected by bolt 178, or other suitable means, to the lower portion 34 of the secondary frame. The rearward end of the forward extension arms 176 have a treaded opening for receiving an adjustment threaded screw 179 so that the operator may raise or lower the secondary surface drum 174 by turning the adjustment screw 179. When the adjustment screw 179 is properly positioned the forward extending arms 176 may be locked by turning down the lock nut 180. As illustrated, the secondary surfacing drum 174 may be covered by sand paper 175, or other suitable material, and is driven by means of a belt 181 that is looped around the pulley 94 provided on the end bell 121 of the electric motor. The tension of the driving belt 181 is maintained at a proper value by means of an idle pulley 182, which is allowed to move up and down under the biasing action of the spring 184.

Figure 19:
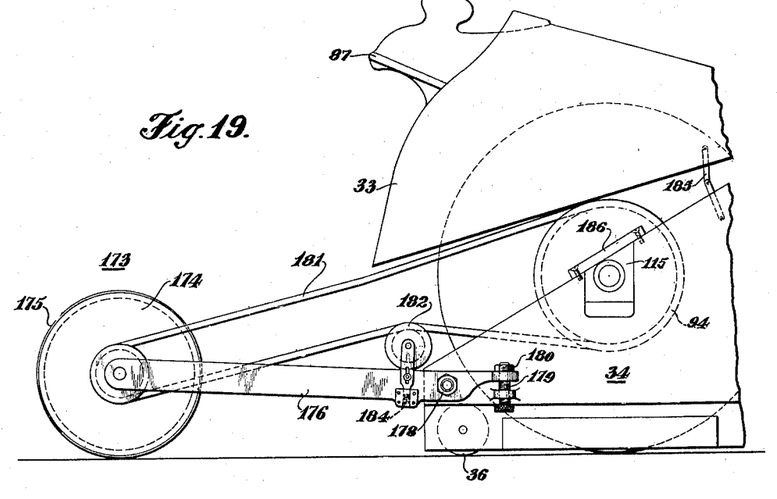
Figure 19 is a side-elevational view of a fragmentary portion of my surfacing machine shown in combination with an edging unit comprising a secondary surfacing drum mounted in advance of my main surfacing machine.

When operating the edging unit 173 the hinged cover 33 is held in a semi-raised position by means of an elbow hinge 185. Also, since it is necessary to operate the surfacing machine with the hinged cover 33 partly raised the shaft of the electric motor, which under this condition would be normally unsecure in the frame, is held down by means of a plate 186, which is removably connected to the lower portion 34 of the secondary frame by means of suitable screws or the like. Therefore, by the utilization of my edging unit 173 it is possible to work corners of a room.

Figure 20:
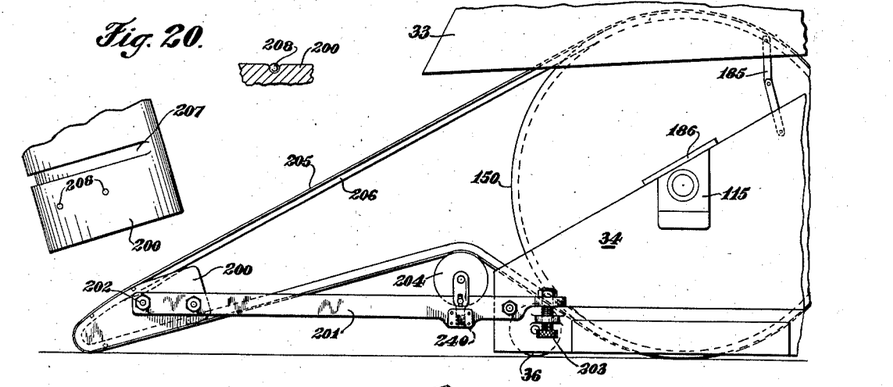
Figure 20 is a side-elevational view of a fragmentary portion of my main surfacing machine shown in combination with a modified edging unit comprising a stationary shoe mounted in advance of the main surfacing machine.
Figure 25:
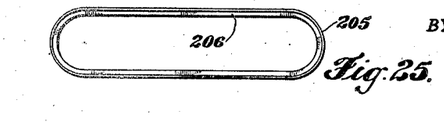
Figure 25 shows a side view of an endless piece of sand paper, or other working material, which is utilized to loop around the main surfacing drum and the stationary shoe of the edging unit which is positioned in advance of the main surfacing machine.

In Figure 20 I show a modification of my edging unit. This modification includes a stationary shoe 200 carried by the forward end of the extension arms 201, which are similar in construction to the extension 176 of Figure 19. In this modification an endless strip of sand paper 205, or other suitable material, is looped around the surfacing drum and the stationary shoe 200. Such an endless piece of sand paper, or other working material, is shown in Figure 25, in which there is provided on the inside surface thereof an endless guiding strip 206, which fits in suitably depressed portions in the surfacing drum and in the stationary shoe 200. The depressed portions in the stationary shoe 200 are represented by the reference character 207, see Figure 20. The tension of the endless piece of sand paper, or other working material, is maintained at a proper value by means of an idle pulley 204, which is allowed to move up and down under the biased action of the spring 240. In the shoe 200 there are provided some pockets for the reception of anti-friction ball bearings 208, over which the endless piece of sand paper, or other working material, rides to reduce the friction as the endless piece of sand paper, or other suitable material, passes over the shoe. As is manifest, the shoe 200 may be moved up and down relative to the floor to be surfaced by turning the adjustment screw 203, which is similar in construction to the adjustment screw 179 of Figure 19. By means of my edging units, as shown in Figures 19 and 20, in combination with the main surfacing machine, it is possible to surface the entire floor of a room without resorting to manual means of surfacing the corners where heretofore it has been impossible to surface by power-driven machines.

In Figure 21 I show a fragmentary portion of a steering handle 220 for my surfacing machine. This steering handle 220 is connected by means of a swivel ratchet joint 224 to a yoke 221, which fits into suitable receptacles 222 carried by the rear end of the primary frame, see Figures 1, 2, 21 and 22. When the lower ends of the yoke 221 are fully inserted within the receptacles 222, there is a semi-circular washer 223 which may be swung around and locked within a suitable circumferential groove provided in the lower-most end of the yoke 221. When disengaging the yoke from the primary frame it is only necessary for the operator to unlatch the semi-circular washers 223 and then slidably remove the yoke from the frame. Any adjustment in the elevation of the steering handle 220 may be effected by adjusting the swivel ratchet 224.

Since certain changes in my invention may be made without departing from the spirit and scope thereof, it is intended that all matters contained in the foregoing description and shown in the accompanying drawings, shall be interpreted as illustrative and not in a limiting sense.

I claim as my invention:

1. A surfacing machine comprising, in combination, an electric motor having a revolvable rotor and a stationary field, said revolvable rotor constituting a surfacing drum, a primary frame having means adapted to bear upon the surface to be worked for supporting the primary frame upon the said surface, a secondary frame pivoted to the primary frame and having means adapted to bear upon the surface to be worked for supporting the secondary frame upon the said surface, means for so pivotally mounting the frames together that the pivotal means joins the lower portions of the primary and secondary frames together and moves up and down relative to the surface to be worked as the frames move relative to each other, means for mounting the electric motor in one of the frames and off to one side of the pivotal means whereby the surfacing drum may be brought into working engagement with the surface to be worked at a slower rate than the pivotal means moves up and down relative to the surface to be worked.

2. A surfacing machine comprising, in combination, an electric motor having a revolvable rotor and a stationary field, said revolvable rotor constituting a surfacing drum, a primary frame disposed on one side of the surfacing drum, a secondary frame having an intermediate portion, means for pivotally mounting the intermediate portion to that portion of the primary frame which is adjacent to the surfacing drum, that portion of the secondary frame which is on the same side of the surfacing drum as the primary frame being designated as the rearward portion and that portion of the secondary frame which is in advance of the primary frame being designated as the forward portion, means for supporting the primary frame and the forward portion of the secondary frame slightly away from the surface to be worked, means for mounting the electric motor in the forward portion of the secondary frame so that the surfacing drum may be brought into working engagement with the surface to be worked, and an adjustment means for moving the rearward end of the secondary frame relative to the primary frame, thereby causing the forward end of the secondary frame to vary the working engagement between the surfacing drum and the surface to be worked.

3. A surfacing machine comprising, in combination, an electric motor having a revolvable rotor and a stationary field, said revolvable rotor constituting a surfacing drum, a primary frame disposed on one side of the surfacing drum, a secondary frame having an intermediate portion, means for pivotally mounting the intermediate portion to that portion of the primary frame which is adjacent to the surfacing drum, that portion of the secondary frame which is on the same side of the surfacing drum as the primary frame being designated as the rearward portion and that portion of the secondary frame which is in advance of the primary frame being designated as the forward portion, means for supporting the primary frame and the forward portion of the secondary frame slightly away from the surface to be worked, means for mounting the electric motor in the forward portion of the secondary frame so that the surfacing drum may be brought into working engagement with the surface to be worked, rotary adjustment means mounted in the rearward portion of the secondary frame, and a threaded element connected to the primary frame and adapted to be threadably engaged by the rotary adjustment means, whereby the position of the surfacing drum is varied relative to the surface to be worked by the turning of the rotary adjustment means.

4. A surfacing machine comprising, in combination, an electric motor having a revolvable rotor and a stationary field, said revolvable rotor constituting a surfacing drum, a primary frame disposed on one side of the surfacing drum, a secondary frame having an intermediate portion, means for pivotally mounting the intermediate portion to that portion of the primary frame which is adjacent to the surfacing drum, that portion of the secondary frame which is on the same side of the surfacing drum as the primary frame being designated as the rearward portion and that portion of the secondary frame which is in advance of the primary frame being designated as the forward portion, means for supporting the primary frame and the forward portion of the secondary frame slightly away from the surface to be worked, means for mounting the electric motor in the forward portion of the secondary frame so that the surfacing drum may be brought into working engagement with the surface to be worked, rotary adjustment means mounted in the rearward portion of the secondary frame, a threaded element connected to the primary frame and adapted to be threadably engaged by the rotary adjustment means, whereby the position of the surfacing drum is varied relative to the surface to be worked by the turning of the rotary adjustment means, graduated indications provided on the rotary adjustment means for indicating the position of the surface drum relative to the surface to be worked, and means for illuminating the graduated indications.

5. A surfacing machine comprising, in combination, an electric motor having a revolvable rotor and a stationary field, said revolvable rotor constituting a surfacing drum, a primary frame disposed on one side of the surfacing drum, a secondary frame having one portion positioned in advance of the primary frame and having another portion positioned substantially over the primary frame, means for pivotally mounting the intermediate portion of the secondary frame to the primary frame, means for mounting the electric motor in that portion of the secondary frame which is positioned in advance of the primary frame so that the surfacing drum may be brought into working engagement with the surface to be worked, means for supporting the primary frame which is in rear of the surfacing drum and that portion of the secondary frame which is in advance of the surfacing drum slightly away from the surface to be worked, and an adjustment means for moving the secondary frame relative to the primary frame, thereby varying the working engagement between the surfacing drum and the surface to be worked.

6. A surfacing machine comprising, in combination, an electric motor having a revolvable rotor and a stationary field, said revolvable rotor constituting a surfacing drum, a primary frame disposed on the rearward side of the surfacing drum, suction means carried by the primary frame and adapted to collect the dust and other particles from the surface to be worked and from the surfacing drum, means for driving the suction means by the electric motor, a secondary frame having one portion positioned in advance of the primary frame and having another portion positioned substantially over the suction means, means for mounting the electric motor in that portion of the secondary frame which is positioned in advance of the primary frame so that the surfacing drum may be brought into working engagement with the surface to be worked, means for supporting the primary frame which is in rear of the surfacing drum and that portion of the secondary frame which is in advance of the surfacing drum slightly away from the surface to be worked, and an adjustment means for moving the secondary frame relative to the primary frame, thereby varying the working engagement between the surfacing drum and the surface to be worked.

7. A surfacing machine comprising, in combination, an electric motor having a revolvable rotor and a stationary field, said revolvable rotor constituting a surfacing drum, a primary frame disposed on one side of the surfacing drum, a secondary frame having one portion positioned in advance of the primary frame and having another portion positioned substantially over the primary frame, means for pivotally mounting the intermediate portion of the secondary frame to the primary frame, said secondary frame having an opening through which the electric motor may be removed from or inserted upon the secondary frame, means for mounting the electric motor in that portion of the secondary frame which is positioned in advance of the primary frame so that the surfacing drum may be brought into working engagement with the surface to be worked, a cover for the said opening and for holding the electric motor in the secondary frame, means for supporting the primary frame which is in rear of the surfacing drum and that portion of the secondary frame which is in advance of the surfacing drum slightly away from the surface to be worked, and an adjustment means for moving the secondary frame relative to the primary frame, thereby varying the working engagement between the surfacing drum and the surface to be worked.

8. A surfacing machine comprising in combination, an electric motor having a revolvable rotor and stationary field, said revolvable rotor constituting a surfacing drum, a primary frame having means adapted to bear upon the surface to be worked for supporting the primary frame upon the said surface, a secondary frame pivoted to the primary frame and having means adapted to bear upon the surface to be worked for supporting the secondary frame upon the said surface, means for so pivotally mounting the frames together that the pivotal means joins the lower portions of the primary and secondary frames together and move up and down relative to the surface to be worked as the frames move relative to each other, said secondary frame having an opening through which the electric motor may be removed from or inserted upon the secondary frame, means for mounting the electric motor in the secondary frame and off to one side of the pivotal means whereby the surfacing drum may be brought into working engagement with the surface to be worked at a slower rate than the pivotal means moves up and down relative to the surface to be worked, means carried by the secondary frame for locking the field of the motor against rotation, a cover for the said opening, and an adjustment means for moving the secondary frame relative to the primary frame to vary the working engagement between the surfacing drum and the surface to be worked.

9. A surfacing machine comprising, in combination, an electric motor having a revolvable rotor and a stationary field, said revolvable rotor constituting a surfacing drum, a main frame for the electric motor, a secondary surfacing drum, means for mounting the secondary surfacing drum in advance of the main frame, means for adjustably varying the working position of the secondary surfacing drum relative to the surface to be worked, and means for driving the secondary surfacing drum by the revolvable rotor.

10. An edging unit for a surfacing machine having a main surfacing drum comprising, in combination, edging means adapted to be mounted in advance of the surfacing machine, said edging means having an abrasive adapted to contact revolubly the surface to be worked, means for driving the edging means by the main drum, so as to make the abrasive contact revolubly the surface to be worked, and means for adjustably varying the working position of the edging means relative to the surface to be worked.

11. In a surfacing machine, the combination with a frame, of a hollow handle for the frame, a light source mounted within the hollow handle, the inner hollow surface of said handle constituting a protective shield for the light source.

12. In a surfacing machine, the combination with a surfacing drum adapted to work a surface adjacent to a quarter-round or the like, of side frames for supporting the surfacing drum, each of side frames having its lower edge portion arranged inwardly from that portion of the side frame above the said edge portion and being adapted to clear the quarter-round or the like, so that the surfacing drum may work the surface adjacent the quarter-round or the like.

13. A working device adapted to be brought into cooperative working engagement with the work, comprising, in combination, a frame having relatively movable parts pivotally connected together which move up and down relative to the work as they are moved relative to each other, each of said parts having means adapted to bear upon the surface to be worked for supporting the frame from the said surface, a rotary engaging work means, means for mounting the rotary engaging work means on one of the said parts and off to one side of the place where the parts are connected together, and means for moving the relatively movable parts of the frame to adjust the rotary engaging work means relative to the work.

14. A surfacing device comprising, in combination, a frame having relatively movable parts pivotally connected together which move up and down relative to the surface to be worked as they are moved relative to each other, each of said parts having means adapted to bear upon the surface to be worked for supporting the frame upon the said surface, a surface engaging device, means for mounting the surface engaging device on one of the said parts and off to one side of the place where the two parts are connected together, and means for moving the relatively movable parts of the frame to adjust the surface engaging device relative to the surface to be worked.

15. A surfacing device comprising, in combination, a surfacing drum, a frame having relatively movable parts pivotally connected together which move up and down relative to the surface to be worked as they are moved relative to each other, each of said parts having means adapted to bear upon the surface to be worked for supporting the frame from the said surface, means for mounting the surfacing drum on one of the said parts and off to one side of the place where the two parts are connected together, and adjusting means for moving the relatively movable parts of the frame to adjust the surfacing drum relative to the surface to be worked.

16. A surfacing device comprising, in combination, a motor having a locked field and a revolvable rotor constituting a surfacing drum, a frame having relatively movable parts pivotally connected together which move up and down relative to the surface to be worked as they are moved relative to each other, each of said parts having means adapted to bear upon the surface to be worked for supporting the frame from the said surface, means for mounting the surfacing drum on one of the said parts and off to one side of the place where the parts are connected together, adjusting means for moving the relatively movable parts of the frame to adjust the surfacing drum relative to the surface to be worked, and means for locking the field against rotation in the frame.

17. A surfacing device comprising, in combination, a surfacing drum, a frame for supporting the surfacing drum, said frame having relatively movable parts supported at their outer ends from the surface to be worked and hinged at their inner ends, so that the said parts move relative to the surface to be worked as they are moved relative to each other, means for mounting the working device on one of the said parts and off to one side of the inner hinged ends, and adjusting means for moving the relatively movable parts of the frame to adjust the surfacing drum relative to the surface to be worked.

18. A surfacing device comprising, in combination, a surfacing drum, suction means, a frame for supporting the surfacing drum and the suction means, said frame having relatively movable parts supported at their outer ends from the surface to be worked and hinged at their inner ends, so that the said parts move relative to the surface to be worked as they are moved relative to each other, means for mounting the surfacing drum on one of the said parts, means for mounting the suction means on the other of said parts, and adjusting means for moving the relatively movable parts of the frame to adjust the surfacing drum and the suction means relative to the surface to be worked.

19. A surfacing machine comprising, in combination, a surfacing drum, suction means, a frame having relatively movable parts, means for mounting the surfacing drum on one of said parts, means for mounting the suction means on the other of said parts, said parts being supported at their outer ends from the surface to be worked and hinged at their inner ends, so that the said parts move relative to the surface to be worked as they are moved relative to each other, and adjusting means for moving the relatively movable parts of the frame to adjust the surfacing drum and the suction means relative to the surface to be worked.

20. A surfacing machine comprising, in combination, a surfacing drum, suction means, a frame having relatively movable parts, means for mounting the surfacing drum on one of said parts, means for mounting the suction means on the other of said parts, said parts being supported at their outer ends from the surface to be worked and hinged at their inner ends, so that the said parts move relative to the surface to be worked as they are moved relative to each other, adjusting means for moving the relatively movable parts of the frame to adjust the surfacing drum and the suction means relative to the surface to be worked, and means for driving the suction means by the surfacing drum.

21. A surfacing machine comprising, in combination, a main surfacing drum, a main frame for the surfacing drum, a secondary surfacing drum, a secondary frame adapted to be detachably connected to and carried by the main frame, means for supporting the secondary surfacing drum in the secondary frame, said secondary surfacing drum having a smaller diameter than the main surfacing drum, means for adjustably varying the working position of the secondary surfacing drum relative to the surface to be worked, and means for driving the secondary surfacing drum by the main surfacing drum.

22. A surfacing machine comprising, in combination, a main frame, a main surfacing drum, a secondary surfacing drum, a secondary frame adapted to be detachably connected to and carried by the main frame, means for mounting the secondary drum in the secondary frame, means for adjustably mounting the said drums, so as to vary their position relative to the surface to be worked, and means for driving the said drums.

23. The combination with a main surfacing machine having a main surfacing drum, of an edging unit adapted to be detachably connected to and carried by the main surfacing machine, said edging unit having an abrasive adapted to contact revolubly the surface to be worked, means for mounting the edging unit in advance of the main surfacing machine, means for adjustably varying the working position of the edging unit relative to the surface to be worked, and means for driving the edging unit by the main drum, so as to make the abrasive contact revolubly the surface to be worked.

24. A working device adapted to be brought into working engagement with the work comprising, in combination, a frame having relatively movable parts pivotally connected together which move up and down relative to the work as they are moved relative to each other, each of said parts having means adapted to bear upon the surface to be worked for supporting the frame upon the said surface, a rotary engaging work means, means for mounting the rotary engaging work means on one of the said parts and off to one side of the place where the parts are connected together, suction means associated with the working device to collect the dust and other particles, and means for moving the relatively movable parts of the frame to adjust the rotary engaging work means relative to the work.

25. A working device adapted to be brought into working engagement with the work comprising, in combination, a frame having relatively movable parts pivotally connected together which move up and down relative to the work as they are moved relative to each other, each of said parts having means adapted to bear upon the surface to be worked for supporting the frame upon the said surface, a rotary engaging work means, means for mounting the rotary engaging work means on one of said parts and off to one side of the place where the parts are connected together, suction means, means for mounting the suction means on the other of said parts and off to one side of the place where the parts are connected together, and means for moving the relatively movable parts of the frame to adjust the rotary engaging work means relative to the work.

26. A surfacing device comprising, in combination, a surfacing drum, a frame having relatively movable parts pivotally connected together which move up and down relative to the surface to be worked as they are moved relative to each other, each of said parts having means adapted to bear upon the surface to be worked for supporting the frame upon the said surface, means for mounting the surfacing drum on one of said parts and off to one side of the place where the parts are connected together, rotary adjustment means connected to one of said parts, and a threaded element connected to the other of said parts and adapted to be threadably engaged by the rotary adjustment means, whereby the position of the surfacing drum is varied relative to the surface to be worked by the turning of the rotary adjustment means.

27. A surfacing device comprising, in combination, a surfacing drum, a frame having relatively movable parts pivotally connected together which move up and down relative to the surface to be worked as they are moved relative to each other, each of said parts having means adapted to bear upon the surface to be worked for supporting the frame upon the said surface, means for mounting the surfacing drum on one of said parts and off to one side of the place where the parts are connected together, rotary adjustment means connected to one of said parts, a threaded element connected to the other part and adapted to be threadably engaged by the rotary adjustment means, whereby the position of the surfacing drum is varied relative to the surface to be worked by the turning of the rotary adjustment means, and means for resiliently restraining the rotation of the rotary adjustment means.

28. In a surfacing machine having a revolvable surfacing drum adapted to drive an auxiliary device, in combination, a frame having relatively movable parts pivotally connected together which move up and down relative to the surface to be worked as they are moved relative to each other, each of said parts having means adapted to bear upon the surface to be worked for supporting the frame upon said surface, means for mounting the auxiliary device upon one of the pivotally connected parts of the frame, an electric motor having a revolvable rotor, a stationary field and shafts, means for mounting and locking against rotation the field shafts in the frame, said rotor constituting the revolvable drum, means for rotatively mounting the revolvable drum upon the stationary field shafts, driving means positioned between the end of the revolvable drum and the frame, and carried by revolvable drum, and driving connection means interconnecting the driving means and the auxiliary device to drive the latter.

29. In a surfacing machine, the combination with a surfacing drum adapted to work a surface adjacent to a quarter-round or the like, of side frames for supporting the surfacing drum, each of said side frames having its lower edge portion arranged inwardly from that portion of the side frame above the said edge portion and being adapted to clear the quarter round or the like, so that the surfacing drum may work the surface adjacent the quarter-round or the like, each of said lower edge portions having a part removed to expose the edge of the surfacing drum, and a movable closure for the removed part to enclose the edge of the surfacing drum.

30. A surfacing device comprising in combination, an electric motor having a revolvable rotor and a stationary field, a frame having relatively movable parts connected together which move relative to the work as they move relative to each other, each of said parts having means adapted to bear upon the surface to be worked for supporting the frame upon the said surface, means for locking the field of the motor against rotation in one of said parts and off to one side of the place where the parts are connected together, and means for moving the relatively movable parts of the frame to adjust the working device relative to the work.

31. In combination, a primary frame, pivotal means, a secondary frame pivotally mounted to the pivotal means, the arrangement of the primary frame, the secondary frame, and the pivotal means being such that the pivotal means moves up and down relative to the surface to be worked as the two frames move relative to each other, primary frame and the secondary frame each having means adapted to bear upon the surface to be worked for supporting the frames upon the said surface, an electric motor having a revolvable rotor and a stationary field, means for mounting the stationary field in the secondary frame and off to one side of the pivotal means, means carried by the secondary frame to hold the stationary field against rotation, a cover supported by the secondary frame for covering the revolvable rotor, said cover being independent of the holding means and adapted to be actuated or moved to afford access to the motor while the field is held against rotation in the frame.

32. In combination, a frame, an electric motor having a revolvable rotor and a stationary field, means for mounting the stationary field in the frame, means carried by the frame to hold the stationary field against rotation, a hinged cover pivotally supported by the frame for covering the revolvable rotor, said cover being independent of the holding means and adapted to be actuated or moved to afford access to the motor while the field is held against rotation in the frame, suction means mounted on the frame and positioned in cooperative relation with the revolvable rotor, said suction means being operative independently of the positions of the hinged cover, said cover having an external canopied recess, a light source mounted within the external canopied recess, said external canopied recess being formed with an open end for the insertion and removal of the light source, the bottom portion of said external canopied recess being formed by the cover itself, the top portion of the said external canopied recess being formed by a portion spaced from the cover, the inner recessed surface of the said external canopied recess constituting a protective shield for the said light source.

33. A surfacing machine comprising, in combination, an electric motor having a revolvable rotor and a stationary field, said revolvable rotor constituting a surfacing drum, a main frame for the electric motor, a detachable frame carried by the main frame, a work rotary element, means for pivotally mounting the work rotary element upon the detachable frame and in spaced relationship to the revolvable rotor, and means including an adjustable idler pulley means for driving the work rotary element by the revolvable rotor.

34. In a surfacing machine, the combination with a surfacing drum adapted to work a surface adjacent to a quarter-round or the like, of a main frame having sides for supporting the surfacing drum, at least one of said sides of the supporting main frame having its lower edge portion arranged inwardly from that portion of said side of the supporting main frame above the said lower edge portion and being adapted to clear the quarter-round or the like, so that the surfacing drum may work the surface adjacent the quarter-round or the like.

35. A surfacing machine comprising, in combination, an electric motor having a revolvable rotor and a stationary field, said revolvable rotor constituting a surfacing drum, a main frame for the electric motor, a detachable work device driven by the electric motor, said detachable work device including a rotating element detachably and pivotally positioned in spaced relation to the revolvable rotor, and driving means engaging the revolvable rotor for rotating the work device.

36. A surfacing machine comprising, in combination, an electric motor having a revolvable rotor and a stationary field, said revolvable rotor constituting a surfacing drum, a main frame for the electric motor, a detachable work device driven by the electric motor, said detachable work device including a rotating element detachably and pivotally positioned in spaced relation to the revolvable rotor, driving means engaging the revolvable rotor for rotating the work device, and an idler pulley for influencing the said driving means.

37. A surfacing machine comprising, in combination, an electric motor having a revolvable rotor and a stationary field, said revolvable rotor constituting a surfacing drum, a main frame for the electric motor, a detachable work device driven by the electric motor, said detachable work device including a rotating element detachably and pivotably positioned in spaced relation to the revolvable rotor, driving means engaging the revolvable rotor for rotating the work device, and suction means for collecting dust and other particles caused by the work.

38. A surfacing machine comprising, in combination, an electric motor having a revolvable rotor and a stationary field, said revolvable rotor constituting a surfacing drum, a main frame for the electric motor, a detachable work device driven by the electric motor, said detachable work device including a rotating element detachably and pivotally positioned in spaced relation to the revolvable rotor, driving means engaging the revolvable rotor for rotating the work device, an idler pulley for influencing the said driving means, and suction means for collecting dust and other particles caused by the work.

HOMER L. TRIMBLE.